United States Patent [19]
Stoops

[11] Patent Number: 5,615,828
[45] Date of Patent: Apr. 1, 1997

[54] METHOD AND APPARATUS FOR APPLYING FLUX

[75] Inventor: Bradley N. Stoops, Bay Village, Ohio

[73] Assignee: Precision Dispensing Equipment, Inc., Bay Village, Ohio

[21] Appl. No.: 397,395

[22] Filed: Mar. 2, 1995

Related U.S. Application Data

[63] Continuation-in-part of Ser. No. 90,663, Jul. 13, 1993, abandoned, which is a continuation-in-part of Ser. No. 931,786, Aug. 18, 1992, Pat. No. 5,328,085.

[51] Int. Cl.$^6$ .................................................. B23K 37/00
[52] U.S. Cl. ............................ 228/223; 118/74; 118/313; 118/669; 118/710; 228/33; 427/286; 427/421; 427/96
[58] Field of Search .................................. 118/710, 668, 118/300, 324, 501, 313, 315, 326, 713, 746, 669, 679, 682, 683, 684, 697; 228/33, 223; 427/286, 421, 8, 96

[56] References Cited

U.S. PATENT DOCUMENTS

| | | |
|---|---|---|
| 4,695,482 | 9/1987 | Weiswurm . |
| 4,697,730 | 10/1987 | Spigarelli et al. . |
| 4,796,795 | 1/1989 | Urban . |
| 4,806,706 | 2/1989 | Machida et al. . |
| 4,821,948 | 4/1989 | Fisher et al. . |
| 4,848,271 | 7/1989 | Clark . |
| 4,873,938 | 10/1989 | Ciniglio . |
| 4,898,320 | 2/1990 | Dunaway et al. . |
| 4,899,924 | 2/1990 | Kawaguchi . |
| 4,967,933 | 11/1990 | Maiorca et al. . |
| 4,986,462 | 1/1991 | Hethcoat . |
| 5,024,856 | 6/1991 | Hehnerlein . |
| 5,038,706 | 8/1991 | Morris . |
| 5,042,708 | 8/1991 | Ledermann et al. . |
| 5,052,338 | 10/1991 | Maiorca et al. . |
| 5,065,692 | 11/1991 | Hollesen et al. . |
| 5,065,932 | 11/1991 | Hayden et al. . |
| 5,074,455 | 12/1991 | Peana et al. . |
| 5,145,531 | 9/1992 | Turner et al. . |
| 5,328,085 | 7/1994 | Stoops et al. . |
| 5,368,219 | 11/1994 | Hogan et al. ........................... 228/33 |

*Primary Examiner*—Jill Warden
*Assistant Examiner*—Jan M. Ludlow
*Attorney, Agent, or Firm*—Fay, Sharpe, Beall, Fagan, Minnich & McKee

[57] ABSTRACT

A dispensing apparatus for applying a pulsed thin stream of flux to a surface such as a printed circuit board. The stream of flux is pulsed at a high rate to apply a thin layer of flux on the surface. The dispensing head consists of multiple orifices for applying the flux to the board. The streams of flux are angularly disposed and a pan is positioned for capturing flux which passes by the board. The board is conveyed by the dispensing head. Controls are incorporated for board sensing and identification, application width selection, precise pressure control, fluid flow monitoring and system safety conditions.

31 Claims, 5 Drawing Sheets

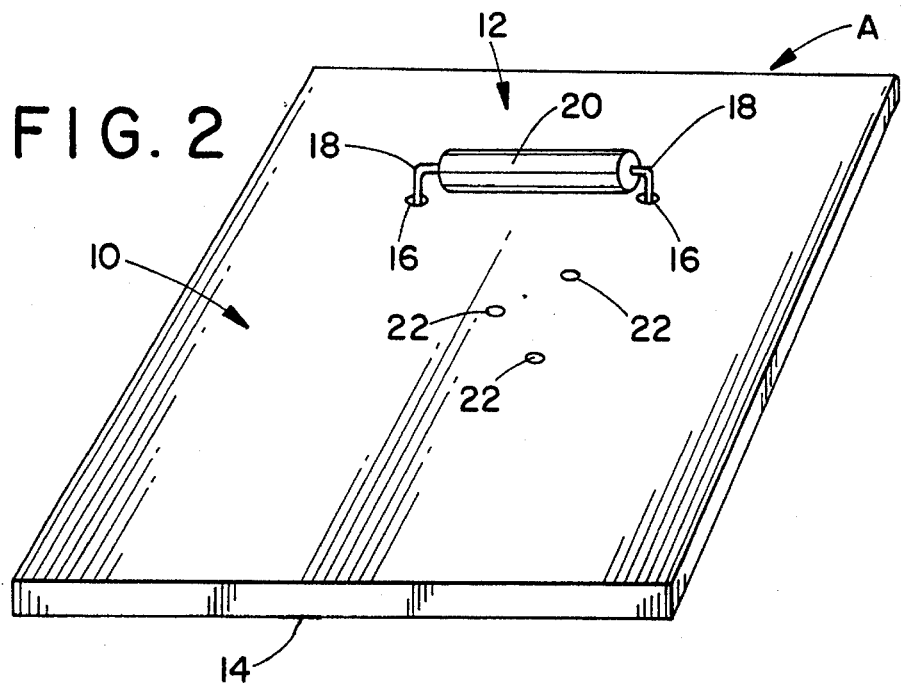
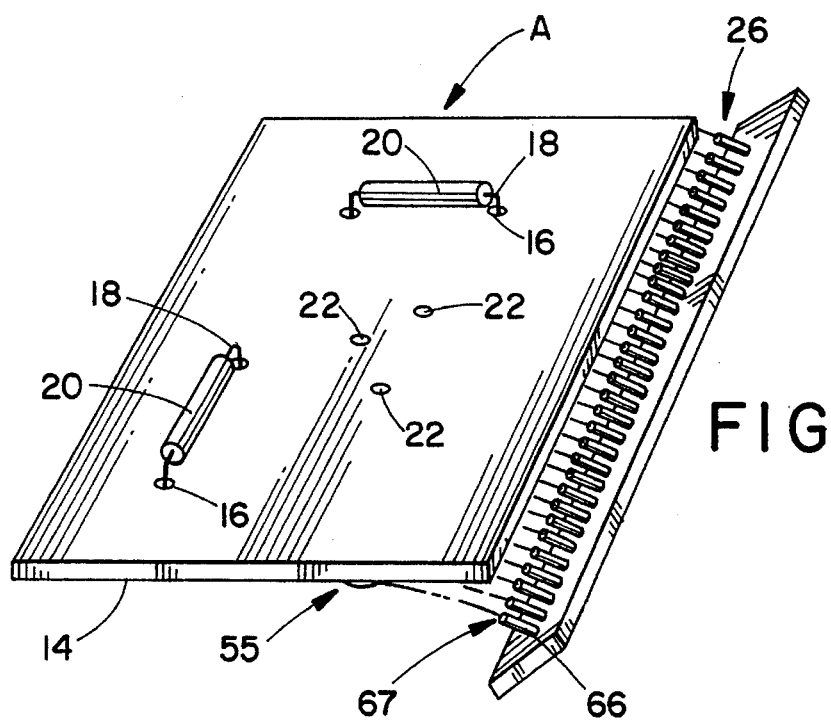
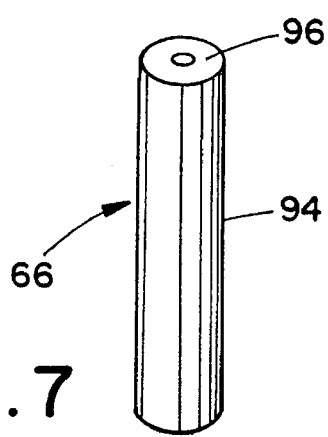

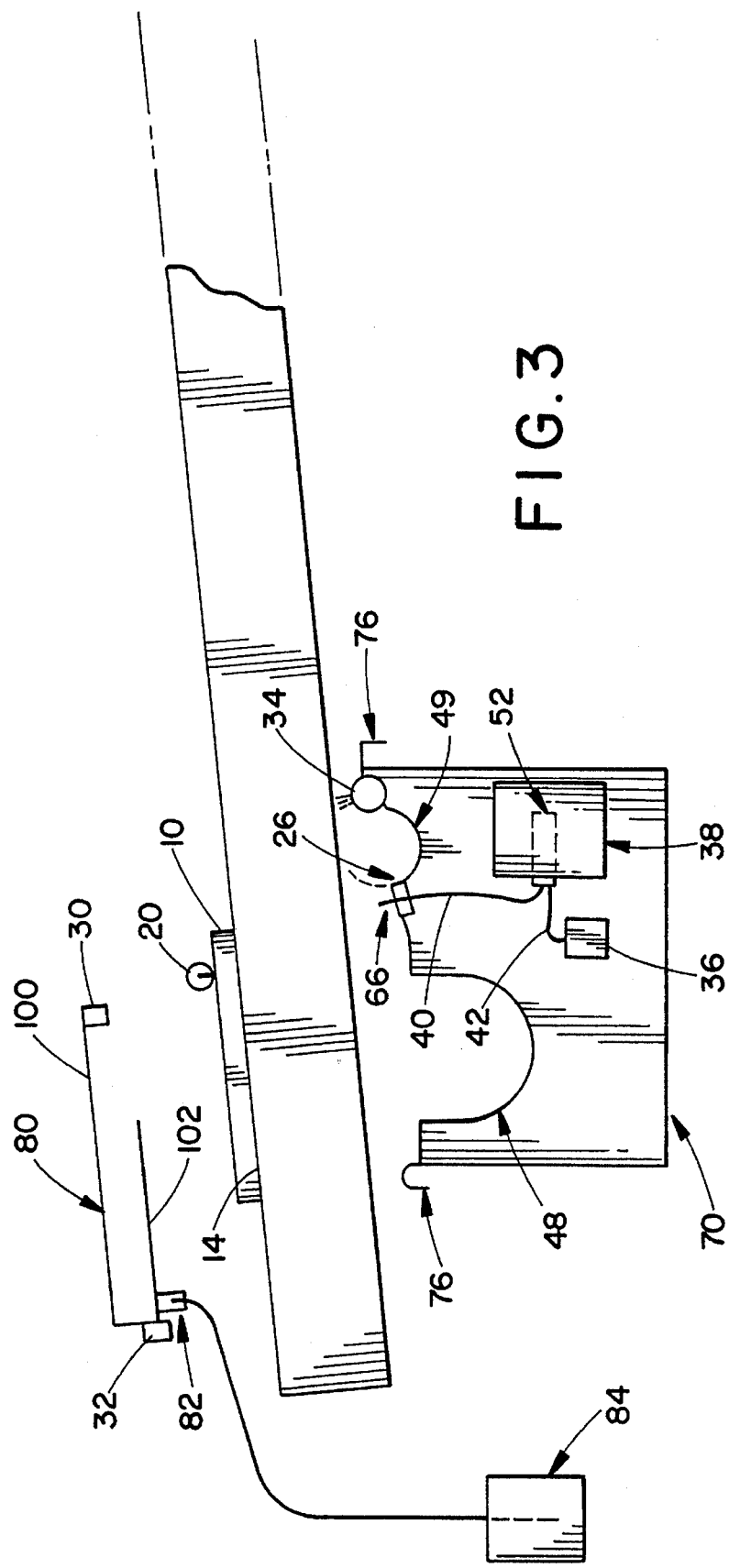

METHOD AND APPARATUS FOR APPLYING FLUX

BACKGROUND OF THE INVENTION

This application is a continuation-in-part application of commonly assigned, U.S. Ser. No. 08/090,663, filed Jul. 13, 1993, now abandoned which is a continuation-in-part application of U.S. Ser. No. 07/931,786, filed Aug. 18, 1992, now issued U.S. Pat. No. 5,328,085.

This invention pertains to a method and apparatus for dispensing fluid materials, and more particularly to a method and apparatus for dispensing flux on a surface such as a printed circuit board. The invention is particularly applicable to dispensing low-solids flux and will be described with particular reference thereto. However, it will be appreciated that the invention has broader applications and may be advantageously employed with other types of fluxes.

The soldering process of printed circuit boards is comprised of three separate and essential steps which are normally performed within a single machine. These steps include (i) flux application, (ii) preheating the board, and (iii) soldering. Soldering flux is generally defined as "a chemically and physically active formula which promotes wetting of a metal surface by molten solder, by removing the oxide or other surface films from the base metals and the solder. The flux also protects the surfaces from reoxidation during soldering and alters the surface tension of the molten solder and the base metal." (Institute for Interconnecting and Packaging Electronic Circuits (TPC), ANSI/TPC/SF-818, "General Requirements for Electronic Soldering Fluxes" 1988 3.1.18).

The soldered board typically requires cleaning to remove flux residues. Cleaning operations usually employ chlorofluorocarbon (CFC) containing materials, solvents, or water. Studies indicate that use of CFC containing materials destroy, or adversely contribute to the destruction of, earth's stratospheric ozone. Solvents can emit volatile organic compounds (VOC) into the environment.

Thus, elimination of the subsequent cleaning operations for printed circuit boards will, in turn, address environmental concerns of ozone depletion or other environmental issues associated with post soldering cleaning operations. Due in part to the environmental concern with post soldering cleaning operations, the industry increasingly emphasizes use of low-solids fluxes. Low solids fluxes contain small amounts of solids, e.g., five weight percent or less. Use of low-solids fluxes are intended to limit the amount of residue remaining on the board after soldering is completed so that subsequent cleaning operations can be eliminated.

Low solids fluxes have also contained solvents which emit VOC's into the environment. To address the VOC concern of low solids fluxes,, water-based (VOC-free) fluxes are now being used. These fluxes are difficult to use since water does not evaporate quickly and will cause residual solder balls on the board due to the impact of the hot solder with the water. Therefore, the water must be fully evaporated before solder is applied to the board. Current processes add additional heaters prior to the soldering to dry the printed circuit board as one method of attempting to address this evaporation requirement. Water cleaning systems require extensive treatment of the water for re-use in the water cleaning operation.

Known structures and methods generally used for applying flux to a printed circuit board are described in U.S. Pat. No. 4,821,948. These conventional techniques include liquid wave, foaming, brushing, or spraying (atomizing), all of which are deemed to be deficient in one manner or another in achieving the overall goals of uniformity and effectiveness of flux application.

Focusing more particularly on low-solids fluxes, three methods of applying this type of flux are commonly used. The flux is applied using a wave in an open bath of flux in a manner analogous to the wave soldering technique. An open bath of flux is pumped into a wave form and the board surface passes into the wave crest. In addition to problems associated with flux being inadvertently placed on the top of the board, the uniformity of application and ability to precisely control the amount of flux application can be problematic.

Moreover, since the bath of flux is exposed to the atmosphere, the specific gravity of the flux is subject to change. With low-solids fluxes, conventional techniques of controlling specific gravity with automatic density controllers is ineffective since the low amount of solids in the composition is sensitive to slight changes of solvent.

A foam fluxer can alternately be used. This flux application technique also has an open bath of flux through which air bubbles are passed to form a foam layer. The board is passed through the foam layer to apply the flux to the desired surface. Since this method also requires an open reservoir, control of the specific gravity of the flux is a concern. The bubbling and splattering associated with the foam fluxing technique lacks the desired uniformity and precision of application, along with the potential for flux to be deposited on the upper surface of the board.

The third commonly used technique of applying low solids flux to a board is spraying. The '948 patent describes one type of high velocity spray in which the flux is ultrasonically atomized. More particularly, the flux is dispersed into the path of a substantially laminar air flow to allegedly provide uniform flux application. An enclosing structure collects and exhausts the vapors that result from this flux application. Other spraying techniques which atomize the flux, including the use of a rotating mesh drum in which the flux is atomized by an air knife from the surface of the drum, are known in the art.

As the spray nozzle and board move relative to one another according to the various spray techniques, the lack of uniformity of flux application is apparent. The moving mechanisms add additional complexity. Stationary spray heads are alternatively employed to reduce the mechanisms but cannot compensate for the pattern uniformities as a result.

Moreover, in known spray systems, a problem arises in controlling the spray as it passes around the board. Extensive exhaust systems incorporating filters are employed as one manner of spray control. Cleaning the structures exposed to the spray and cleaning the spray mechanism itself are, however, time consuming. Further, atomized sprays present a flammability concern and the disposal of contaminated filters are problems associated with these systems and this spray process.

Spraying techniques are not as effective at filling the holes in printed circuit boards as the open-bath wave fluxing process is with its associated capillary action. This is particularly important since many manufacturers are now assembling printed circuit boards which employ an organic or inorganic solderability preservative (OSP) solution on the copper surfaces of the fabricated board prior to component placement and soldering. The OSP eliminates the need to apply solder to the surfaces on the board—such as the component pads and via holes—prior to component placement, flux application and wave soldering.

As a result of the application of OSP on the unassembled printed circuit board, the wave soldering process becomes much more demanding as there are now many small holes (as small as 0.010" or less) without preapplied solder. The capillary action is necessary to fill these holes with flux and to provide complete flux application for well-soldered printed circuit boards. Spray and foam flux application is insufficient to provide complete flux application where tiny openings of this small magnitude are at issue.

Accordingly, the industry requires a flux applying apparatus and process for applying flux that overcomes these concerns and problems, as well as others.

SUMMARY OF THE INVENTION

According to the present invention, there is provided a method and apparatus for applying flux to a surface by pulsing small directed pulsed streams of flux.

According to another aspect of the invention, the pulse rate is in the range of one to forty milliseconds on time and three to two hundred milliseconds off time.

According to still another aspect of the invention, the pulsed stream of flux is tilted relative to the board.

According to yet another aspect, the position of the printed circuit board is sensed for determining when to actuate and deactuate the pulsed streams of flux.

According to a further aspect, the width of the flux application can be selected for flux application to only the board surface of the board.

According to another aspect, a capture reservoir is positioned above the directed pulsed streams to capture any flux which passes through open areas in the board.

A principal advantage of the invention resides in a uniform, precisely controlled application of flux to a printed circuit board.

Another advantage of the invention is the ability to effectively fill small holes.

Still another advantage is realized in the use of a low solids flux to address environmental concerns, and the ability to precisely apply flux to the printed circuit board.

Yet another advantage is that no atomized mist of flux is produced and any flux which is not applied to the board is captured.

Another advantage is that the pulsed flux application results in a thin layer of flux on the printed circuit board.

A still further advantage is that controls and flux monitors are integrated to precisely control flux application amount and location.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments and methods of which will be described in detail in the specification and illustrated in the accompanying drawings which form a part hereof, and wherein:

FIG. 2 is a perspective view of a printed circuit board that incorporates components and through holes and via holes for soldering;

FIG. 3 is an elevational view of the preferred flux dispensing apparatus integrated into a wave solder system according to the subject invention;

FIG. 5 is an enlarged perspective view of a preferred dispenser apparatus showing the use of tips tilted at an angle for applying flux to a printed circuit board surface;

FIG. 7 is a perspective view of a preferred tip.

DETAILED DESCRIPTION OF THE PREFERRED EMBODIMENT

Figure 1:
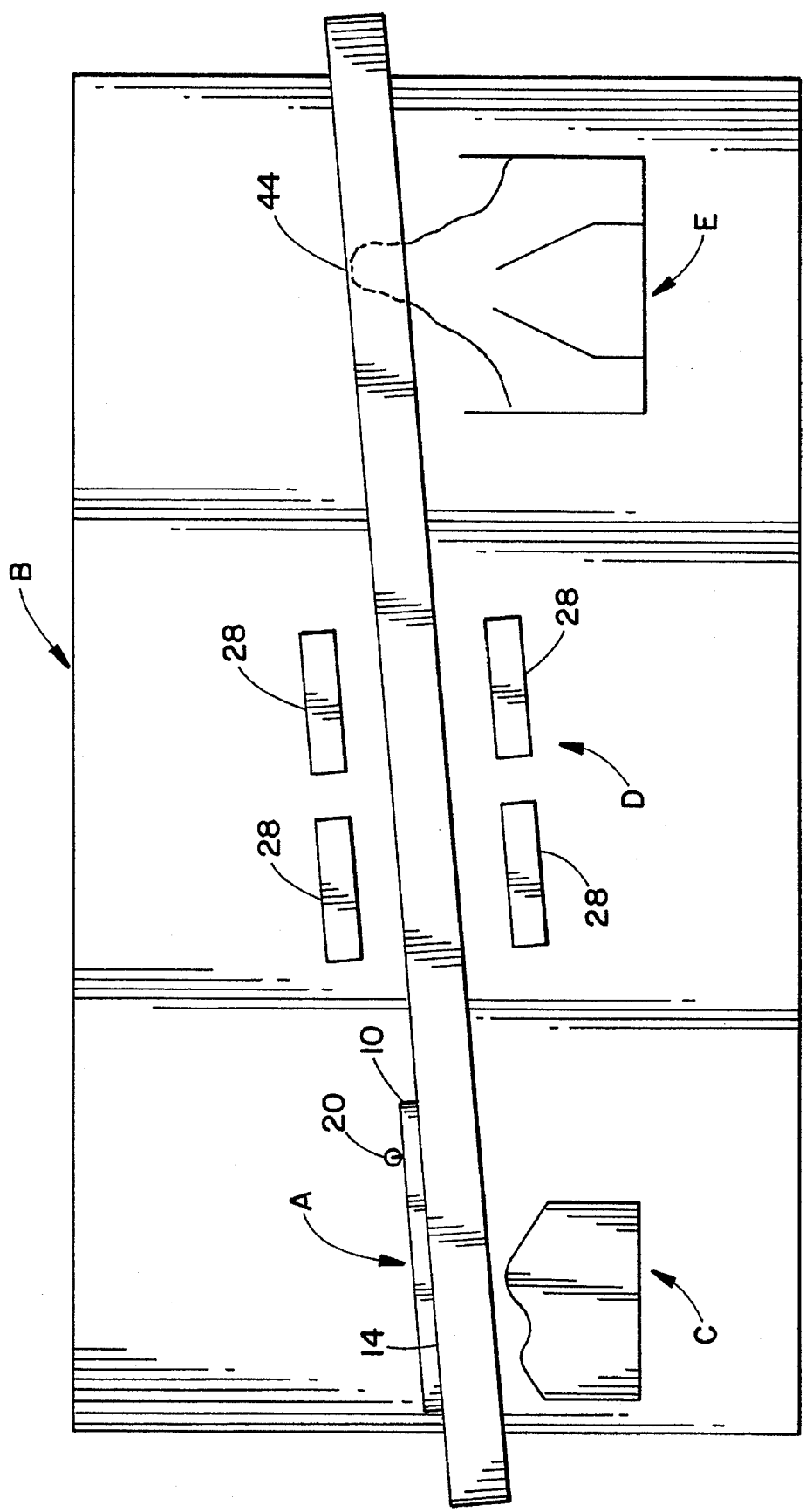
FIG. 1 is a schematic illustration of selected stations in the printed circuit board assembly process, namely flux application and solder application stations.

Referring now to the drawings wherein the showings are for purposes of illustrating the preferred embodiment and method of the invention only and not for purposes of limiting same, the FIGURES show a printed circuit board A which passes through an assembly apparatus B that includes a fluxing system or station C, preheater D, and soldering system or station E (FIG. 1).

More particularly, and with additional reference to FIG. 2, a printed circuit board is illustrated and includes a board 10 comprised of an insulating material having a first or upper surface 12 and a second or lower surface 14. A series of through holes 16 receive leads 18 of a through hole component 20. The insulating material and through holes include selected areas of metal material associated with component leads for establishing electrical communication as desired.

When the board is ultimately fabricated, the through holes 16 and smaller via holes 22 are filled with solder. The through holes 16 are soldered to the component leads 18. The via holes 22 are filled with solder for electrical communication between the different layers of the board. Particular details of the board construction are well known in the art so that further discussion herein is deemed unnecessary to a full and complete understanding of the subject invention.

When OSP solutions are used, the step of plating the holes is omitted and the board is coated with the OSP solution to protect the copper surfaces. The larger through holes 16 and the smaller via holes 22 are both not plated with solder. The via holes are therefore unfilled with solder. Again, details of the printed circuit board technology in that regard are well known in the art.

Leads 18 extend outwardly from the printed circuit board for soldering to complete the connection with the metal layers. One well known type of soldering process passes the board over a wave of molten solder E so that each component lead is soldered and each hole (through holes and via holes) is filled with solder to complete the electrical connection. As best represented in FIG. 1, prior to passing over the solder wave E, the board surface 14, for example, passes through a flux station C. Flux is dispensed onto the selected surface, and as the board proceeds through the station (to the right as shown), the solvent or water is driven off at the preheating station D by means of conventional heating elements 28. The flux prepares the surface for the molten solder, removing oxides and other contaminants, and promoting solder wetting. The flux may also include an antioxidant that prevents further oxidation between the flux station and the soldering step.

According to a preferred arrangement, a conveyor supports the printed circuit board, or printed circuit board pallet which contains the board, and advances it through the wave solder system 44 at a constant speed. For reasons which will become more apparent below, the conveyor supports the printed circuit board above the dispensing apparatus. The board typically passes through the wave solder system at a speed of four to six feet per minute.

As best illustrated in FIG. 3, the printed circuit board 10 passes over dispensing head assembly 26. When position monitor or sensor 30 is activated by sensing the board, high-speed valves or regulators 52 selected for the width of the board (FIG. 4) are actuated causing flux to be dispensed from individual tips or, as shown in the FIG. 4, from tip manifold assembly 50. The tip manifold assembly dispenses the flux in individual, thin, pulsed streams that have a high degree of precision and control, as opposed to conventional spray, wave, or foaming techniques.

Flux that passes by the board is captured in a capture reservoir such as pan 80 (FIG. 3). As will be recognized, the openings in the board are larger than the diameter of the individual pulsed streams of flux emitted from the dispensing head so that the pulsed streams of flux can pass through the openings. Therefore, provision must be made for capturing the flux at a region above the board since it is undesirable to coat the upper surface 12 of the board. Preferably, the pressure and velocity of the pulsed streams of flux are selected so that the flux contacts the board at a desired speed and effectively coats the surface of the board. Simultaneously, the velocity of the pulsed stream of flux is such as to extend appreciably beyond the height of the board so that the pan can effectively capture the flux. Moreover, after extended use the pan, or a replaceable portion thereof, may be removed from the dispensing apparatus and cleaned or replaced. Trays 48 and 49 will capture any flux that may fall from the board.

An air knife 34 with ambient or heated air removes any excess flux if needed. Further, the air knife 34, generating a curtain of air, removes excess flux from the openings and assists in the drying of the remaining flux before solder is applied. Accordingly, the air knife is preferably located downstream of the tray 49 and upstream of the soldering station. When using water-based fluxes, the ability of the air knife to remove excess flux from the small via holes assists in the drying of the remaining flux and eliminates the need for additional heating prior to soldering.

Figure 4:
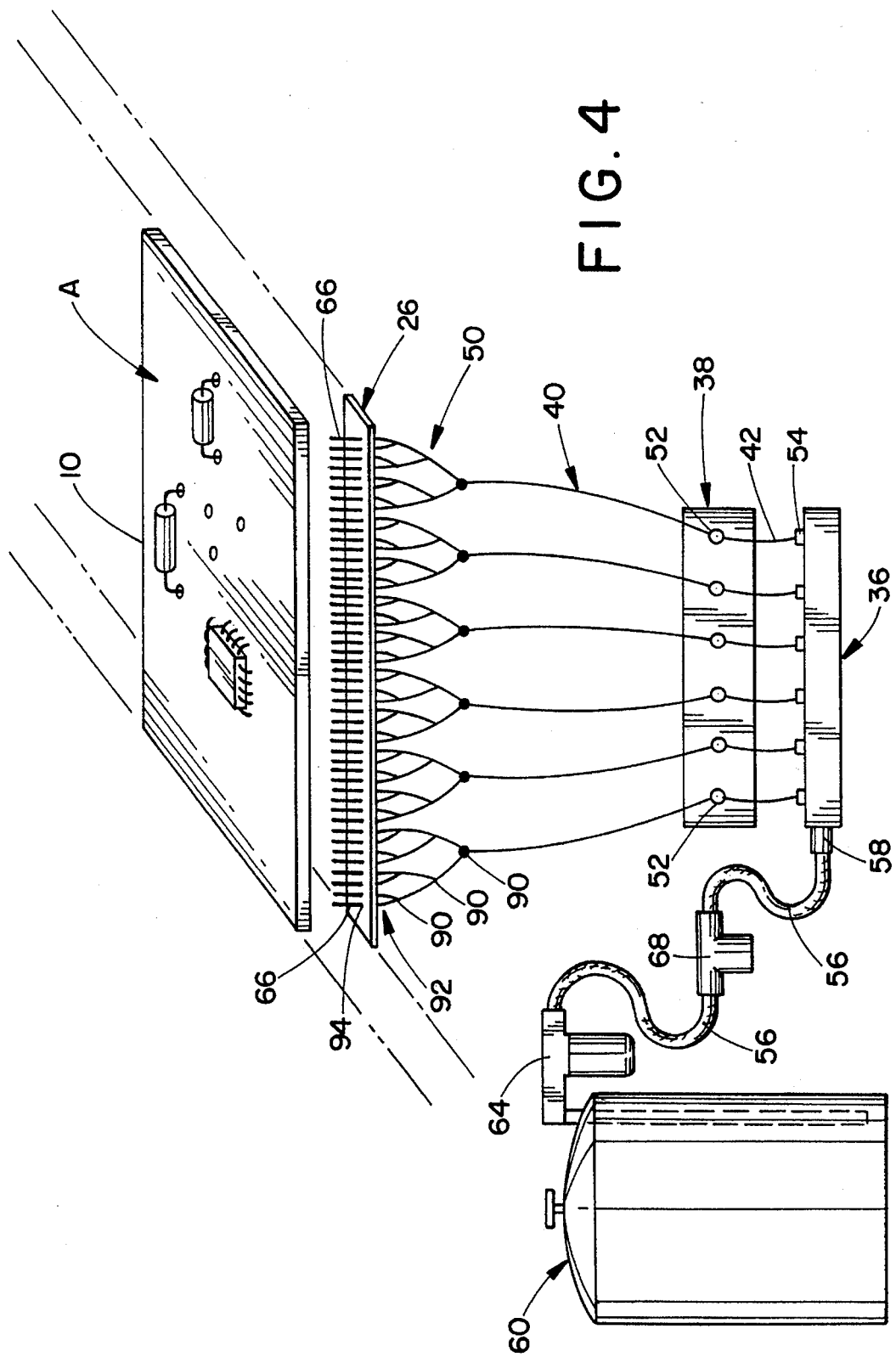
FIG. 4 is an elevational view of the flux dispensing apparatus integrated into a wave solder system taken generally from the left-hand side of FIG. 3.

As illustrated in FIG. 4, the flux is contained in a precisely pressurized reservoir 60 and passes through a filter 64, tubing 56 and fitting 58 to be distributed through main manifold 36. A flow sensor 68 monitors the flow rate. The reservoir can also have a piston which is above the flux and prevents air entrapment in the flux. The flux is then distributed to each high-speed valve or regulator 52 through a fitting 54 mounted on the main manifold. Each valve or regulator then is actuated at a specified pulse rate to distribute flux to an individual tip 66 or to a tip manifold assembly 50. The controls define the pulsed streams 66 or tip manifold 50 which will be activated for the particular board width. Sensor 32 (FIG. 3) can also be used if an end-of-dispense signal is desired before sensor 30 is deactivated as may occur if the board is palletized. The pulsed flux application can also be controlled to be applied, or not applied, at any location on the board as the board travels past the pulsed application.

Through the use of low solids flux, and pulsing at a range of on-times of one to forty milliseconds and off-times of three to two hundred milliseconds, a very thin layer of flux is applied to the selected surface of the board. For example, tests have suggested application of a coating of flux in the amount of 0.0012 g/in2 with a pressurized fluid at five psi and a pulse ratio of fifteen milliseconds on-time and one hundred milliseconds off-time.

As shown in FIG. 5, the flux is preferably dispensed by a dispensing head which is tilted with respect to the printed circuit board A. The tilted pulsed stream 67 provides for complete filling of via holes 22 with flux. Additionally, the pulsed application of the tilted stream 67 applies flux up the component leads 18 for the formation of complete solder connections to the surrounding through hole 16. Further, the tilted stream 67 limits shadowing. Tilting the dispensing head to angles in the range of five to fifty degrees have been used, with the greater angles generally required for OSP board types.

When the board A passes over the pulsed stream of flux 67 from the tilted dispensing head, a travelling wave of flux 55 is generated on the board A. The wave 55 extends across the width of the board and moves across the length of the board A (i.e. right to left as shown in FIG. 5). The wave 55 and the pulsing application effectively apply the flux to not only the surface of the board 14 but to all holes including the via holes 22. This application results in a thin layer of flux consistently applied over the full surface of the board. In addition, capillary action from the travelling wave 55 helps fill the via holes 22 and coat all board and component surfaces.

The pulsing application of flux generates pulsed streams 67 which provide proper flux coverage by ratios of the flux off-time to on-time of 1.5:1 up to 25:1. The pulsed stream length is determined by the on-time, fluid pressure and orifice diameter. The distance between the pulsed streams is determined by the off-time, fluid pressure and orifice diameter.

Referring again to FIG. 3, it also illustrates the application assembly comprising of the dispensing head 26, valve assembly 38, main manifold 36, a main tubing 40 and associated tubing 42, and the two trays 48 and 49 mounted in an assembly 70 which will be in a similar form to current foam and wave structures. This provides ease of integration of the subject invention into existing systems. A support 76 used for the existing flux foam or wave structure accepts the assembly 70 of the subject invention. This will provide for simple location and interchangeable operation of the assembly with the wave solder system.

Figure 6:
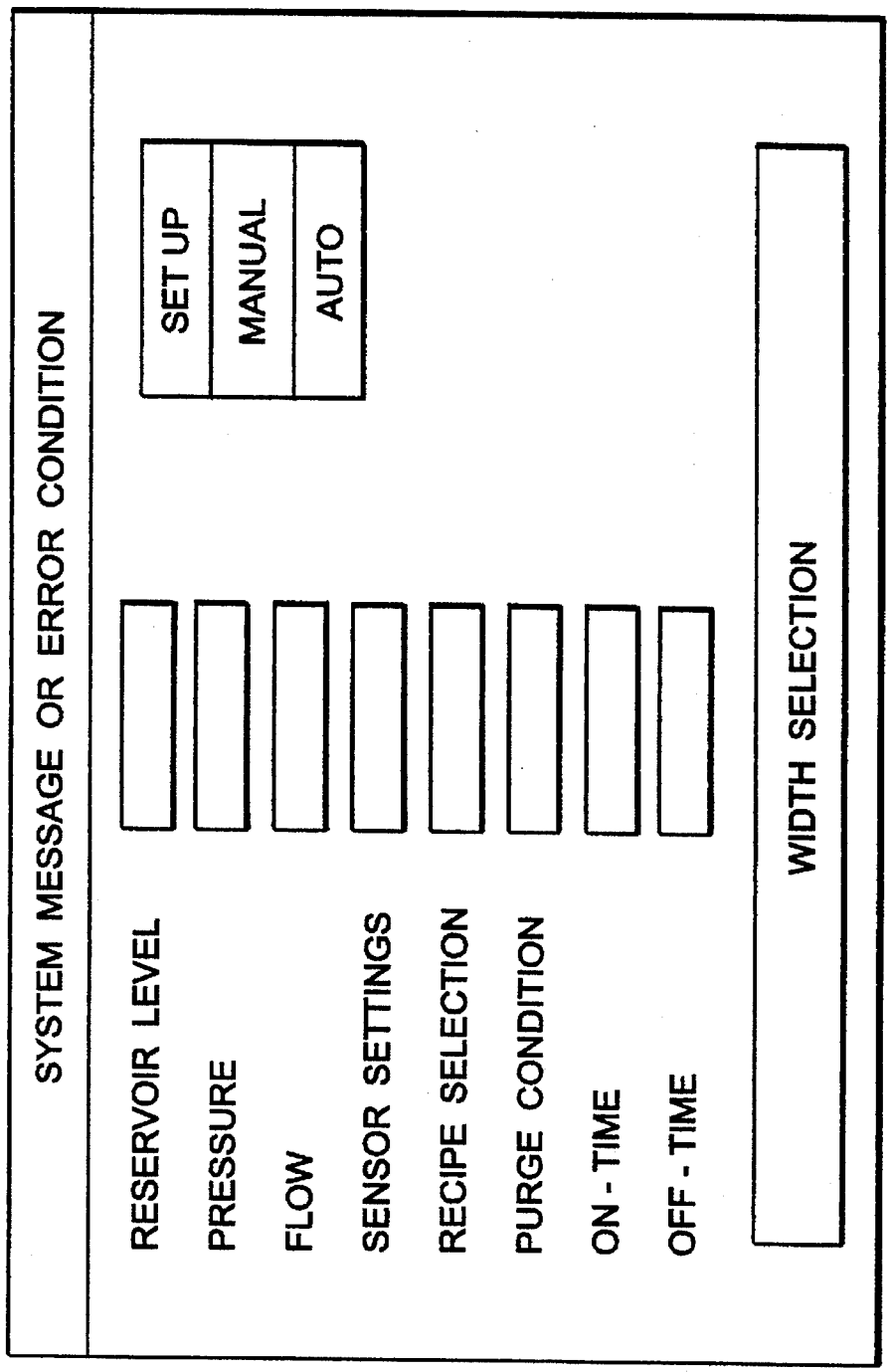
FIG. 6 is a schematic illustration of the operator control panel.

An operational control shown in FIG. 6 provides for easy operator interface and for control of the mode (SETUP, MANUAL or AUTO), width selection, pressure selection and pulse rate selection. The operating interface also displays the actual values for fluid pressure, fluid flow, reservoir level, active tip manifold segments and system safety or error conditions. Of course still other parameters or conditions can be added to the control as desired.

As further shown in FIG. 3, pan 80 is shaped to reflect the flux from the top surface 100 and collect on the surface 102. That is, surface 102 does not extend as far rightwardly as surface 100. Thus, any flux that passes by the board 10 contacts surface 100 and is reflected onto surface 102. A port 82 and overflow container 84 is used to store excess flux that collects and travels via gravity toward the port 82.

The tip manifold assembly can include multiple segments per valve. For example, as illustrated in FIG. 4, the tip manifold includes a main fluid tubing 40 which feeds a series of Y-type fluid connections 90. These Y-type connections successively divide the fluid flow into two equal paths resulting in equal fluid flow through orifice tubing 92 to each tip 66. The equal division of fluid could be achieved by other constructions such as a manifold with equally divided paths. Each dispensing head is held in place with retainer 94 on dispensing head 26. With this approach, each dispensing head operates equally and is easily replaceable because of the similar structure. The tip quantity per tip manifold 50 would be a value of 1, 2, 4, 8, 16, etc.

As illustrated in FIG. 7, the tip preferably has a capillary tube 94 made of a corrosion resistant material such as stainless steel or titanium and an orifice at its end 96 made of a durable and low coefficient of friction material such as sapphire. The precision orifice is in the range of 0.003" to 0.010" diameter and the tolerance in diameter from each tip orifice to another orifice is in the range of 0.0005" or better. These orifice diameters are important so that a fine, thin jet of flux is obtained for effectively coating/filling the small diameter holes in the printed circuit board.

The end of the tip dispensing head also preferably has a downwardly curved or domed surface through which the stream of flux passes. With this structural arrangement, the flux is less likely to sit on the top of the tip and instead is effectively shed away from the tip opening defined through the central portion of the tip dispensing head. In this manner, when the apparatus is initially operated after an extended downtime, there is less chance that flux will coat the tip opening and accurate thin pulsed streams of flux can be immediately obtained.

The invention has been described with reference to the preferred embodiment and method. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A dispensing apparatus adapted to apply flux onto an associated surface such as a printed circuit board, the dispensing apparatus comprising:

a dispensing head having a fluid flow passage through which a stream of flux flows;

a regulator controlling the fluid flow through the passage at a pressure substantially less than 400 psi;

an actuator operatively associated with the regulator that induces pulsing in the stream of flux, the actuator having a pulse on-time of approximately one to forty milliseconds and a pulse off-time of three to two hundred milliseconds; and an orifice communicating with the passage through which the pulsing stream of flux exits from the dispensing head to form a layer of flux on an associated surface of the printed circuit board, the orifice being approximately 0.003 inches to 0.010 inches in diameter.

2. The dispensing apparatus according to claim 1 wherein the orifice is formed in sapphire.

3. The dispensing apparatus according to claim 1 wherein the orifice is located in a curved surface of the dispensing head such that flux cannot collect on the surface.

4. The dispensing apparatus according to claim 1 further comprising a capturing assembly that collects any excess flux.

5. The dispensing apparatus according to claim 1 wherein the dispensing head is incident to the board at an angle less than orthogonal so that the stream of flux is applied at an angle to the associated surface.

6. The dispensing apparatus according to claim 1 further comprising an air knife disposed adjacent the dispensing head for directing ambient or heated air blowing onto the associated surface.

7. The dispensing apparatus according to claim 1 further comprising:

a pressure meter operatively associated with the passage to monitor the pressure of the stream of flux; and a flow-rate meter operatively associated with the passage to measure the flow rate of the stream of flux.

8. The dispensing apparatus according to claim 1 further comprising:

a sensor that determines when the associated surface is within a predetermined range for flux application; and wherein said activator is operatively associated with the sensor to activate the pulsing stream of flux.

9. The dispensing apparatus according to claim 1 wherein the actuator is variable to control the duration of the pulse-on time.

10. The dispensing apparatus according to claim 1 wherein the actuator is variable to control the duration of the pulse-off time.

11. The dispensing apparatus as defined in claim 1 wherein the regulator emits fluid flow through the passage at substantially less than 50 psi.

12. The dispensing apparatus as defined in claim 1 wherein the fluid flow pressure is approximately 5 psi.

13. The dispensing apparatus according to claim 1 further comprising a pressurized reservoir of flux supplying the stream of flux.

14. The dispensing apparatus according to claim 13 further comprising a piston that pressurizes the reservoir of flux.

15. The dispensing apparatus according to claim 14 wherein the piston is in direct contact with the reservoir of flux to eliminate air between the flux and the piston.

16. The dispensing apparatus according to claim 1 further comprising a plurality of orifices through which flow a plurality of pulsing streams of flux.

17. The dispensing apparatus according to claim 16 further comprising a manifold operatively connected to the fluid flow passage for uniformly distributing the flux among a plurality of passages leading to the plurality of orifices.

18. The dispensing apparatus according to claim 17 further comprising a system of equal fluid flow passages operatively connected between the fluid flow passage and the plurality of orifices further comprising:

a number of orifices equal to $2^n$, where n is a positive integer; and a number of manifold(s) equal to (n−1), wherein the fluid flow passage is initially divided into two equal fluid flow passages by a manifold, and the two fluid flow passages may each be further divided by two manifolds into four equal fluid flow passages, such division of the fluid flow passage occurring n times, by (n−1) manifolds, and thereby ultimately distributing the flux in the fluid flow passage into $2^n$ equal fluid flow passages, each equal fluid flow passage leading to one of the $2^n$ orifices.

19. The dispensing apparatus according to claim 16 wherein the center of each orifice is spaced approximately 0.040 to 0.250 inches from the center of an adjacent orifice.

20. A dispensing apparatus for applying flux onto an associated surface such as a printed circuit board, the apparatus comprising;

a dispensing head having orifices on the order of 0.003 to 0.010 inches wide for applying a pulsed stream of flux to form a layer on the associated surface;

a regulator for controlling the pressure of the flux through the dispensing head at substantially less than 400 psi;

means for pulsing the stream during the flux application; and the dispensing head being tilted relative to the surface for laying flux at an angle substantially less than orthogonal thereto to apply flux.

21. The dispensing apparatus as defined in claim 20 wherein the dispensing head is directed generally vertically upward for laying a stream of flux on an underside of the associated surface.

22. The dispensing apparatus as defined in claim 20 wherein the dispensing head dispenses flux at a pulsed rate on the order of one to forty milliseconds on-time and three to two hundred milliseconds off-time.

23. The dispensing apparatus as defined in claim 20 further comprising means for moving the dispensing head and surface relative to one another.

24. The dispensing apparatus as defined in claim 20 wherein the regulator dispenses flux at substantially less than 50 psi.

25. The dispensing apparatus as defined in claim 24 wherein the pressure regulator dispenses flux at approximately 5 psi.

26. A method of applying flux from a dispenser to a surface such as a printed circuit board to prepare the surface for subsequent soldering, the flux applying method comprising the steps of:

pressurizing a supply of flux to a level substantially less than 400 psi;

dispensing the flux through orifices on the order of 0.003 to 0.010 inches wide toward a surface in the form of pulsed streams; and dispensing the flux at an angle less than orthogonal to the surface of the board.

27. The method as defined in claim 26 wherein the pulse on-time is in the range of one to forty milliseconds on-time.

28. The method as defined in claim 26 wherein the pulse off-time is in the range of three to two hundred milliseconds off-time.

29. The method as defined in claim 26 wherein the pulse application can be started or stopped at any time or at any location on the surface of the board.

30. The method as defined in claim 26 comprising the further step of dispensing the flux at a pressure substantially less than 50 psi.

31. The method as defined in claim 30 wherein the flux is dispensed at approximately 5 psi.

* * * * *